United States Patent [19]

Suwa

[11] Patent Number: 4,675,787

[45] Date of Patent: Jun. 23, 1987

[54] THIN ELECTRONIC APPARATUS

[75] Inventor: Kaname Suwa, Yokohama, Japan

[73] Assignee: Canon Kabushiki Kaisha, Tokyo, Japan

[21] Appl. No.: 881,410

[22] Filed: Jul. 2, 1986

[30] Foreign Application Priority Data

Jul. 12, 1985 [JP] Japan ................................ 60-152164
Jul. 12, 1985 [JP] Japan ................................ 60-152165
Jul. 12, 1985 [JP] Japan ................................ 60-152166

[51] Int. Cl.⁴ ........................................... H05K 1/18
[52] U.S. Cl. .................................... 361/401; 200/5 A; 350/338; 364/708; 364/709
[58] Field of Search .............. 361/401, 399; 200/5 A; 350/338; 364/708, 709, 712

[56] References Cited

U.S. PATENT DOCUMENTS

| 3,601,753 | 8/1971 | Uberbacher | 361/414 X |
| 4,028,509 | 6/1977 | Zurcher | 174/68.5 X |
| 4,096,577 | 6/1978 | Ferber et al. | 174/68.5 X |
| 4,197,586 | 4/1980 | Nidiffer | 364/708 |
| 4,328,399 | 5/1982 | Perks et al. | 174/68.5 X |
| 4,456,800 | 6/1984 | Holland | 174/68.5 X |
| 4,567,354 | 1/1986 | Sekine | 200/5 A |
| 4,611,261 | 9/1986 | Suwa | 174/68.5 X |

FOREIGN PATENT DOCUMENTS

| 2245415 | 4/1973 | Fed. Rep. of Germany | 364/709 |
| 0038834 | 3/1977 | Japan | 361/399 |

Primary Examiner—R. R. Kucia
Attorney, Agent, or Firm—Fitzpatrick, Cella, Harper & Scinto

[57] ABSTRACT

According to this invention, a plate member provided at a thin electronic apparatus reinforces same using the rigidity of the plate member, makes opposite contacts able to contact using a protrusion of the plate member and reinforces solar cells and an indicator on the apparatus. Press-deformed portions are provided such that when the press-deformed portions are each pressed and deformed against an electrically insulating molded frame member with the plate member inserted therein, data or commands are keyed in.

14 Claims, 7 Drawing Figures

Fig. 5 (X-X)
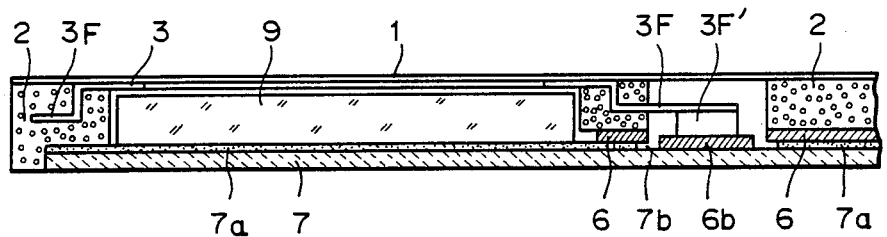
Fig. 6 (Y-Y)
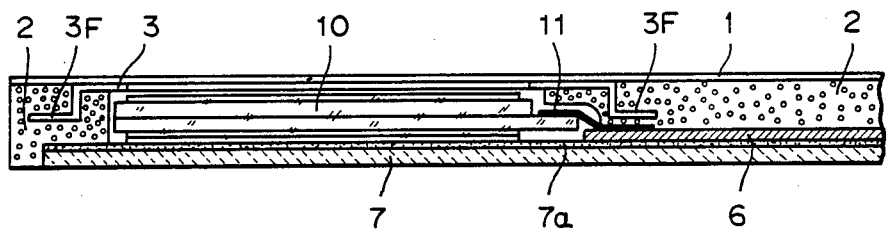
Fig. 7 (Z-Z)
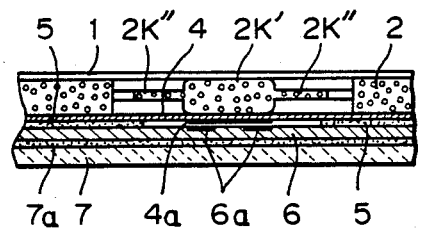

THIN ELECTRONIC APPARATUS

BACKGROUND OF THE INVENTION

1. Field of the Invention

The present invention relates to a thin electronic apparatus which uses a plate member to enhance the rigidity of the apparatus as well as to serve a multipurpose application.

2. Related Background Art

Recently, apparatuses such as electronic calculators and electronic translators have been remarkably miniaturized and lightened. Card type apparatuses have become common.

The miniaturized and lightened apparatuses can be used under a wide variety of circumstances because of their excellent portability. The apparatuses must be sealed from their environments concerning temperature and/or humidity and must have measures against static discharge.

For example, there is a problem in that the circuit elements, such as metal oxide semiconductors used for energy reservation, are prone to be influenced by static charges, i.e., they are prone be damaged by discharge of static charges stored in the operator's body or clothes via the keyboard during operation, or stored data may be changed where of a memory is affected. Thus metal parts which are prone to bear static charge should be connected to the circuit ground potential.

Such a grounded member must be easily mounted in the miniaturized apparatus without enlarging the entire apparatus and ensure secured connection to ground potential against bending, twisting and/or shock (first problem).

The entire circuit is adapted to be driven by solar cells for power reservation. However, especially, a thin apparatus such as a card-like apparatus or an electronic calculator is often put into a commutation-ticket holder when carried and thus it is subjected to stress such as warping, torsion or bending. Generally, a thinned apparatus has no structure to have its circuit substrate accommodated in a case, but a laminated structure of a substrate, an indicator and solar cells through reinforcing plates.

Thus, there is a problem in that the directly held and laminated indicator and solar cells can be damaged by stresses such as bending and/or torsion. As a low power consumption indicator, there is a liquid crystal indicator which has a structure to seal a liquid crystal between thin glass plates. A solar cell includes one which employs a thin plate of a single crystal of silicon or one which employs an amorphous silicon layer formed on a glass plate. These indicator and solar cells often have a thin glass substrate for purposes of thinning and are very fragile so as to be damaged with a slight stress (second problem).

Conventionally, it is known that some apparatuses have a structure in which the case or frame pressably supports many key-top members constituting part of the keyboard. Thus when a key-top member is pressed and displaced to move movable contacts of conductive rubber underlying the key-top member into contact with a printed circuit board, the keying-in of data or commands is performed.

In order to fabricate such apparatus, troublesome work is required which includes appropriate insertion and positioning of many individually molded key-top members with individual different key symbols in the corresponding openings in the frame or case. Furthermore, during the work, an accident is prone to occur which includes tumbling the frame and case to scatter the key-top members.

Since a key-top member slides up and down relative to its corresponding opening, the clearance between the key-top member and its corresponding opening must be controlled with high accuracy and considerable time is required for machining molds for many key-top members.

Furthermore, since the movable contacts are operated by the corresponding key-top member and a separate conductive rubber member, the spacings between the movable contacts and the corresponding fixed contacts on the circuit substrate are not fixed and the operation strokes of the keys are not constant when data or commands are keyed in (third problem).

SUMMARY OF THE INVENTION

A first object of the present invention is to provide a structure in which a first conductive reinforcing plate in contact with the control surface of the apparatus and a second conductive reinforcing plate covering the lower surface of the apparatus are provided such that part of the first reinforcing plate presses a circuit pattern connected to ground potential of a circuit substrate within the apparatus to bring the circuit pattern into contact with the second reinforcing plate.

A second object of the present invention is to provide a structure in which a molded resin frame with a metal reinforcing plate inserted therein to hold solar cells and an indicator, is provided on the exterior surface of an electronic apparatus, so as to surround the solar cells and indicator.

A third object of the present invention is to provide a stucture in which a resin frame maintains the rigidity of an electronic apparatus which performs the keying-in of data and/or commands by causing a respective substrate pressing member to press and bring a plurality of printed circuit substrates, one facing the other, into contact with each other, the frame having formed integrally therewith key-in units which support their respective substrate pressing members elastically in correspondence with the key-in pattern of the printed circuit substrates.

BRIEF DESCRIPTION OF THE DRAWINGS

FIG. 5 is a cross-sectional view taken along the line X—X of FIG. 2;

FIG. 6 is a cross-sectional view taken along the line Y—Y of FIG: 2;

FIG. 7 is a cross-sectional view taken along the line Z—Z of FIG. 2.

DESCRIPTION OF THE PREFERRED EMBODIMENT

Figure 1:
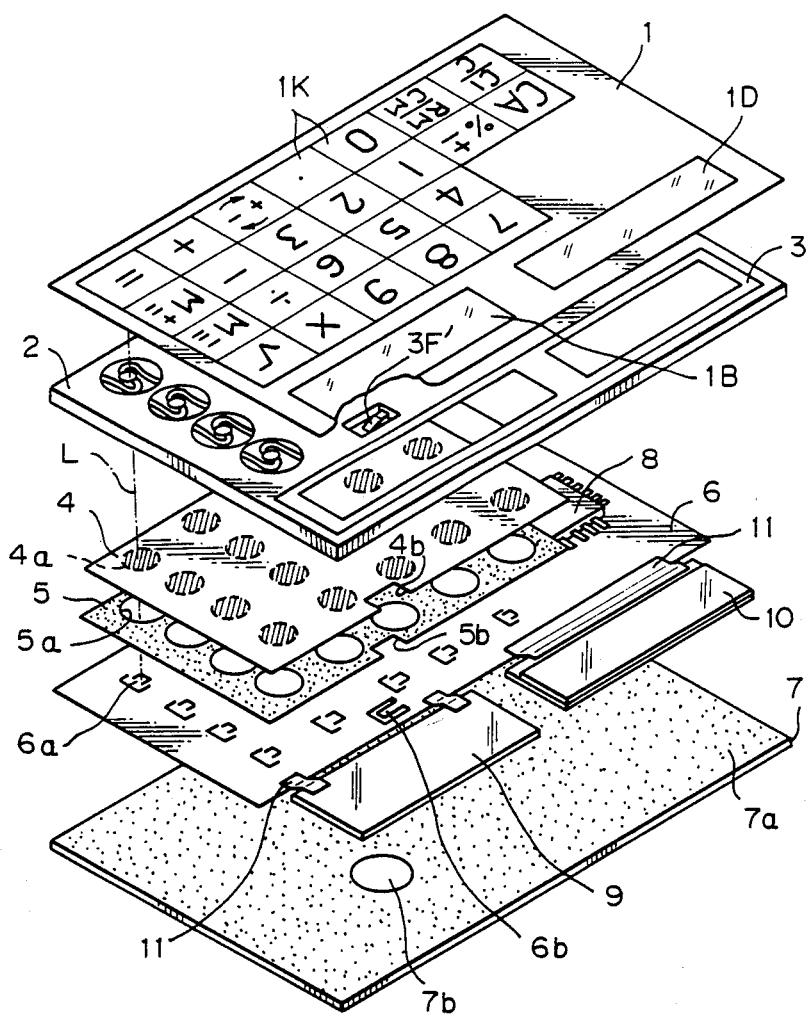
FIG. 1 is an exploded perspective view of an electronic calculator employing the present invention.

The present invention will now be described in detail on the basis of an embodiment thereof illustrated in the drawings.

FIG. 1 is an exploded perspective view showing the structure of a thin electronic calculator as an example of an electronic apparatus according to the present invention. A card-like electronic calculator having an external appearance, as shown in FIG. 2 is derived by laminating the respective components of FIG. 1.

First, the exterior devices on the calculator will be described. As shown in FIG. 2, a keyboard K including a plurality of numeral keys and operation keys is provided on the outer surface of the calculator. Disposed forward of the keyboard are an indicator section D comprising a liquid crystal display (LCD) for visualizing the results of the inputs and calculations, and a solar cell section B for powering the respective circuits of the calculator.

Figure 2:
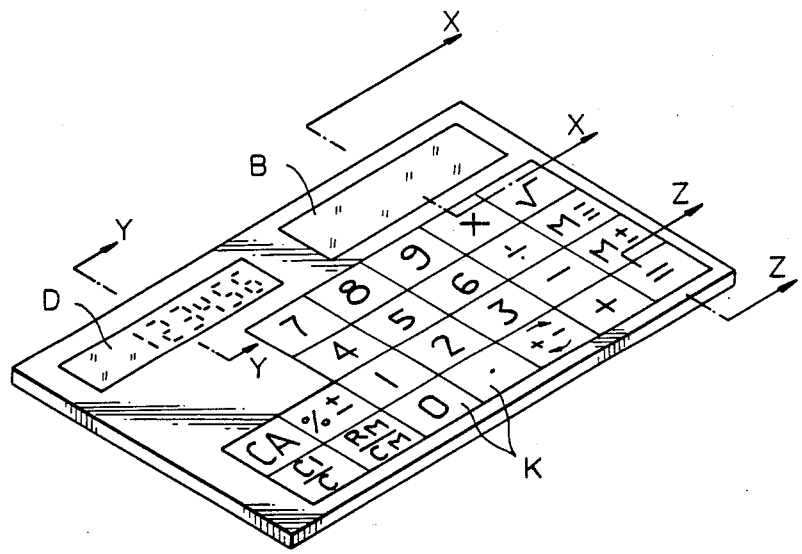
FIG. 2 is an exterior perspective view of the calculator according to the present invention.

The surface of the calculator of FIG. 2 includes an outer cover sheet 1 with a printed symbol 1K (such as keys 1, 2, etc.) indicative of the keyboard K. The sheet is made of a flexible film material such as polyester, polycarbonate, vinyl chloride or curethane having a high light transmission factor. The portions of the sheet facing the indicator section D and the solar cell section B have nothing printed thereon and are composed of transparent sections 1D and 1B, respectively, making the most of the transparency of the material.

Disposed under the outer cover 1 is a frame 2 molded of an insulating plastic material in which frame a thin reinforcing metal plate 3 is inserted. Key-in units 2K are provided at positions in the frame facing the key symbols 1K on the cover sheet 1.

An inner key-top 2K' is positioned centrally within a circular hole in each key-in unit 2K with the upper surface of the inner key-top substantially flush with the upper surface of the frame 2. The inner key-top 2K' is formed integrally with the frame 2 via a plurality of thin arms 2K''. Thus when the portion of the cover sheet 1 where a key symbol 1K is printed is pressed, the sheet film is flexed downward, the upper surface of the inner key-top 2K' is pressed, and the arms 2K'' are elastically deformed and displaced downward substantially in parallel.

The magnitudes of displacement and hence operation stroke and load of each inner key-top 2K' are set to desired values by adjusting the length, thickness and width of the arms 2K''. When the frame 2 is molded, a molded material flows into a space portion where each prospective inner key-top will be molded via corresponding space portions where the prospective arms will be molded. Thus it is necessary to set the dimensions of the arm 2K'' such that no short mold will occur. In the particular embodiment, the arms 2K'' are formed thin to drive with short operation strokes and small operating loads.

As the material of the frame 2, a resin such as polycarbonate, styrol, or polypropylene may be used.

Figure 4:
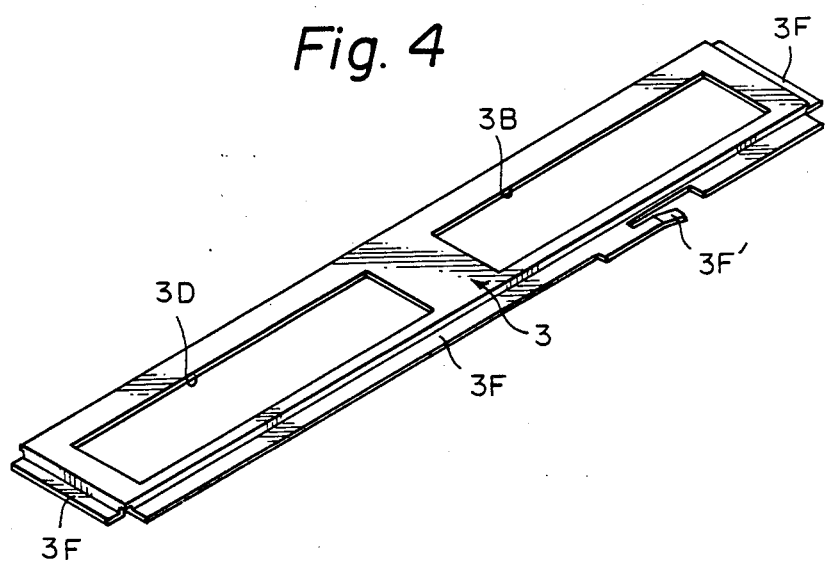
FIG. 4 is a perspective view showing the structure of a reinforcing member of FIG. 3.
Figure 3:
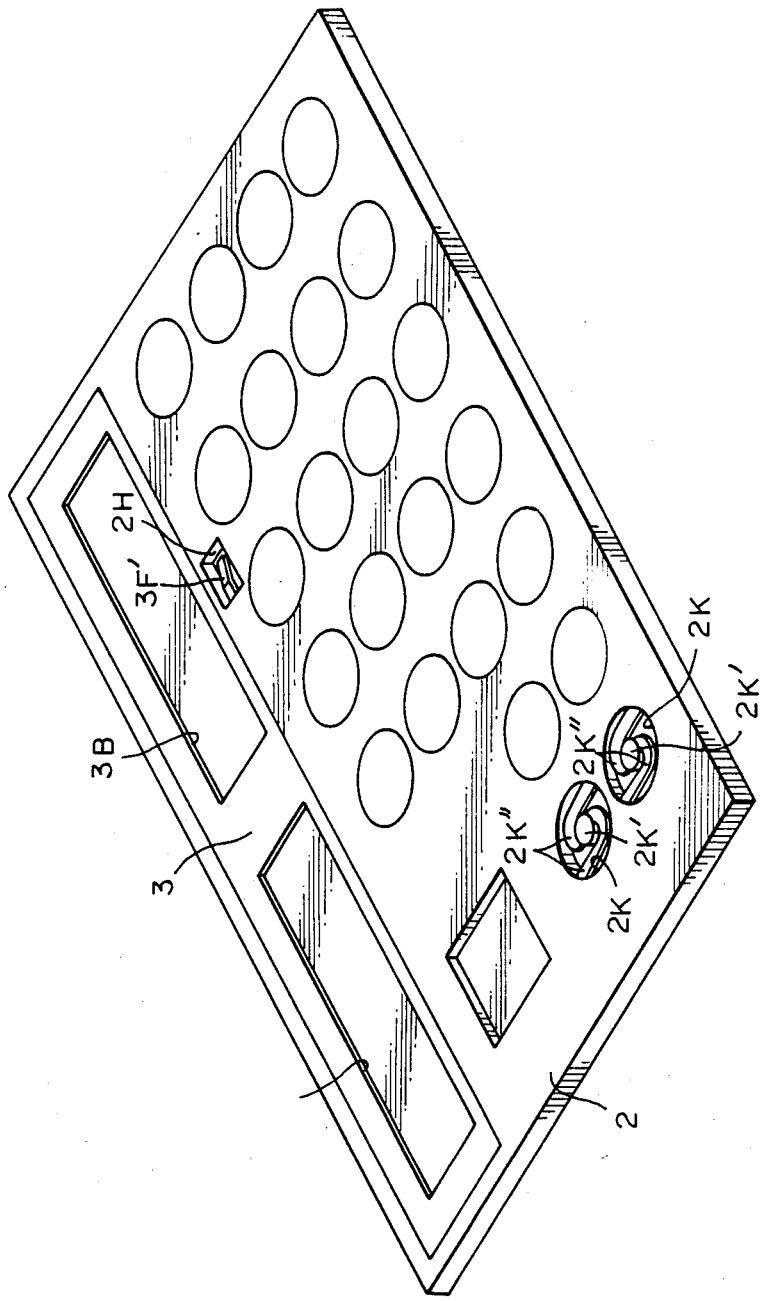
FIG. 3 is a perspective view showing the structure of a frame of FIG. 1.

The inserted reinforcing plate 3 is formed of a metal having high rigidity and high elasticity such as stainless steel, phosphor bronze or brass using a process such as etching or pressing so as to have a desired external form. The outer form of the reinforcing plate before insertion is shown in FIG. 4. The reinforcing plate 3 has L-like flanges 3F around the outer periphery thereof, the flanges extending toward the lower surface of the calculator. They are inserted and embedded in the resin of the frame to enhance the rigidity of the entire frame to increase resistance against torsion and/or bending. Rectangular openings 3D and 3B in the reinforcing plate 3 provide windows through which the indicator 10 and solar cell section 9 disposed under the reinforcing plate 3 face exteriorly. The reinforcing plate 3 has a tongue 3F' near the opening 3B formed by cutting and bending the flange 3F and being exposed through a rectangular opening 2H provided at a position in the frame 2 aligning with the tongue 3F' in order to put the frame at the circuit ground potential. It should be noted that since the frame 2 and reinforcing plate 3 of FIG. 3 are flush with each other, the reinforcing plate 3 is brought in direct contact with the reverse surface of the cover sheet 1 when laminated.

Disposed under the frame 2 is a flexible contact sheet 4 having a printed pattern formed on the lower surface thereof and providing movable key contacts. The contact sheet 4 includes a thin film, for example, of polyester, having a pattern of contacts 4a printed thereon with conductive ink such as carbon paste at positions facing the key-in units in the frame 2.

The contact pattern 4a is pressed by an inner key-top 2K', displaced downward and brought into contact with the corresponding pair of fixed contacts 6a on the printed circuit substrate 6 disposed through the corresponding circular hole 5a in the insulating spacer 5. Short-circuiting of the fixed contacts 6a due to the contacts 4a and 6a being brought into contact with each other causes keying-in of the corresponding data or commands.

Mounted on the printed circuit substrate 6 is a large-scale integrated (LSI) circuit 8 which forms an arithmetic circuitry to which a key input signal is delivered. The arithmetic circuitry 8 performs an arithmetic operation corresponding to the input thereto and outputs the intermediate or final result of the operation to the display 10 for visual display. The drive signal to the display 10 is applied via a heat sealing connector 11. The arithmetic circuitry 8 and indicator 10 are operated with a slight current supplied via the heat sealing connector 11 from the solar cell section 9, and the arithmetic circuitry 8 and the display 10 employ a complementary metal-oxide semiconductor (CMOS) device and a liquid crystal device (LCD), respectively, for reducing power consumption.

A tongue 6b is defined by a U-like slit in the substrate 6 at a position aligned with the tongue 3F' of the frame 2, and faces the tongue 3F' through cuts 4b and 5b in the contact sheet 4 and insulating spacer 5, respectively. A pattern is formed on each side of the tongue 6b and is connected to ground potential.

A relatively thick metal reinforcing plate 7 is put to the lower surface of the printed circuit substrate 6 and bonded and fixed with a bond 7a to the frame 2 so as to hold the contact sheet 4, insulating spacer 5 and printed circuit substrate 6 between the reinforcing plate 7 and the frame 2, thereby completing the laminated structure of the apparatus whereupon the tongue 3F' of the frame 2 presses down the tongue 6b of the circuit substrate 6 into contact with that portion 7b of the reinforcing plate 7 which is not coated with the bond. In this case, the reinforcing plate 7 and the reinforcing plate 3 in the frame 2 are connected to ground potential.

FIG. 5 is a view derived when the section X—X of FIG. 2 is viewed in the direction of the arrow. As shown, the tongue 3F' of the reinforcing plate 3 inserted in the frame 2 presses down the tongue 6b of the circuit substrate with its elasticity into contact with the reinforcing plate 7.

Such structure may cause the reinforcing plate 3 to set at the circuit ground potential to lead any static charge incoming from the outer surface of the cover sheet to the metal reinforcing plate 3, and further to the circuit ground potential to prevent the static charge from being applied to the network including the solar cell section 9, indicator 10 and/or arithmetic circuitry 8. The reinforcing plate 7 is likewise grounded and a static shielding effect and hence a higher protective effect are realized.

The reinforcing plate 3 whose rigidity is enhanced by the flange 3F and the relatively thick reinforcing plate 7 are arranged to surround the solar cell section 9 as shown in FIG. 5, so that the calculator can hardly be deformed even when stresses such as torsion/bending are applied to the entire calculator body and thus the solar cells 9 composed of materials prone to be damaged, such as a silicon wafer and a glass plate, can be protected.

Similarly, as shown in FIG. 6, which is derived when the Y—Y section of FIG. 2 is viewed in the arrow direction, the indicator 10 is also surrounded by the reinforcing plate 3, 7 and no excessive force is applied to the indicator. This structure is effective for use of a display prone to be broken such as a LCD which holds a liquid crystal between glass plates.

FIG. 7 is a view derived when the section Z—Z of FIG. 2 is viewed in the arrow direction. When the cover sheet 1 is pressed down, an inner key-top 2K' is displaced downwardly to cause the contact sheet 4 to contact the printed circuit substrate 6 and hence to cause the contact pattern 4a to short-circuit the corresponding pair of fixed contacts 6a, thereby keying in the corresponding commands or data. As described above, the arms 2K" holding the corresponding inner key-top 2K' are thin and each take the form of an L which surrounds the key-top 2K' thereby to provide a relatively long effective arm length. Thus a slight pressing force and short operation stroke permits keying-in of data or commands.

Since the reinforcing plate 7 of high rigidity and excellent enough to maintain a planar state is bonded to the lower surface of the printed circuit substrate 6, the planar state can be maintained even if the circuit substrate 6 is made of a material prone to be bent and/or twisted. No unevenness occurs in key strokes and/or operating loads, and excellent operability is realized.

While an electronic calculator has been described as an example, the present invention is applicable to apparatuses such as electronic translators.

The main respective structures of the present invention will now be summarized as follows:

With reference to the first problem referred to above;

The metal reinforcing plate 3 is inserted into the frame 2 of FIG. 1. The tongue 3F' provided in the flange of the reinforcing plate 3 presses down the tongue 6b having a grounding pattern on the circuit substrate 6 into contact with the bond-uncoated area 7b of the metal reinforcing plate 7 when laminated. This leads static charge from the control panel in the cover sheet 1 to ground potential without adverse influence on the circuit elements. Since the reinforcing plate 7 acts as a static shielding plate, the occurrence of accidents such as damage to the components and/or disappearance of the stored data can be prevented. That is, the structure is employed in which a first conductive reinforcing plate in contact with the apparatus control panel and a second conductive reinforcing plate covering the lower surface of the apparatus are provided such that a portion of the first reinforcing plate presses a circuit pattern connected to ground potential of the circuit substrate in the apparatus into contact with the second reinforcing plate. Thus the present invention provides an excellent electronic apparatus in which static charge from the control panel is led to ground potential without being applied to the circuit elements and in which static shielding by the second reinforcing plate serves effectively to prevent the occurrence of accidents such as damage to the circuit elements and/or the data.

With respect to the second problem;

The frame 2 of FIG. 1 is molded of a resin with the metal reinforcing plate 3 inserted therein. The reinforcing plate 3 has the flange 3F around the circumference thereof to maintain its rigidity, as shown in FIG. 4. It supports the solar cell section 9 and indicator 10 so as to surround same, as shown in FIGS. 5 and 6. Thus even if the entire apparatus is impressed with stresses, it cannot be deformed easily and prevents the solar cells and display from being broken. That is, in an electronic apparatus with solar cells and a display provided on the exterior surface thereof, a structure is employed in which a molded resin frame with the metal reinforcing plate inserted therein holds the solar cells and display so as to surround same. Thus the present invention provides an excellent electronic apparatus which cannot be deformed easily with stresses such as bending and/or torsion and which effectively prevents the solar cells and display from being broken.

With respect to the third problem;

The frame 2 of FIG. 1 is molded of a resin and includes the reinforcing plate 3 inserted therein. As shown in FIG. 3, a plurality of key-in units 2K are disposed in the holes in the frame 2 aligning with the corresponding key. Each key-in unit includes an inner key-top 2K' as a pressable member and a pair of arms 2K" supporting same and integral with the frame 2. The respective inner key-tops 2K' are molded integrally with the frame 2 and thus there is no unevenness in the operation stokes and loads.

Thus if an inner key-top 2K' is pressed from the exterior of the cover sheet 1, the keying-in of data or commands can be steadily performed with a pleasant sensation of operation and with constant operation stroke and constant operating load. Of course, according to such structure, the troublesome steps of manufacturing and assembling many key-tops individually as in the prior art is omitted. That is, in an electronic apparatus in which individual substrate pressing members are pressed to bring a plurality of printed circuit substrates, one facing the other, into contact with each other in order to perform the keying-in of data or commands, a structure is employed in which a frame which maintains the rigidity of the apparatus is made of a resin, includes key-in units formed integrally therewith and elastically supports the substrate pressing members in correspondence with the key-in unit pattern of the printed circuit substrate. Thus the present invention provides an excellent electronic apparatus which has a key-in mechanism which can be manufactured in simple steps and which performs reliable keying-in of data of commands with even operation strokes and operating loads.

What is claimed is:

1. A thin electronic apparatus comprising:
   a first electrically conductive plate member having an opening and a protrusion;
   an electrically insulating frame member molded integrally with said first plate member inserted therein and having said opening and said protrusion exposed therein;

a second electrically conductive plate member provided parallel to said frame member in facing relationship to same;

a circuit substrate having a predetermined circuit pattern formed between said frame member and said second plate member and having an electrically conductive portion pressed into contact with said second plate member by said protrusion of said first plate member.

2. A thin electronic apparatus according to claim 1, wherein said frame member includes a plurality of press deformable portions in the area of said frame member where said first plate member is not provided.

3. A thin electronic apparatus according to claim 1, wherein said circuit substrate includes at least one of semiconductor elements, a power supply and an indicator mounted thereon.

4. A thin electronic apparatus according to claim 3, wherein at least one of said power supply and indicator is exposed through said opening provided in said first plate member.

5. A thin electronic apparatus comprising:
a first metal plate member having an opening section therein and a bent portion at the periphery thereof;
an electrically insulating frame member having a plurality of press-deformable portions and molded integrally with said first plate member inserted therein;
a second metal plate member provided parallel to said frame member in facing relationship to same; and
means provided between said frame member and second plate member and exposed through said opening section in said first plate member.

6. A thin electronic apparatus according to claim 5, wherein said exposed means includes a solar cell.

7. A thin electronic apparatus according to claim 5, wherein said exposed means includes an indicator.

8. A thin electronic apparatus according to claim 5, wherein said opening section includes two openings and wherein said exposed means include a solar cell and an indicator each being exposed through a respective one of said two openings.

9. A thin electronic apparatus comprising:
an electrically insulating molded frame member having a plurality of press-deformable portions, said frame member having a first metal plate inserted in the area of said frame member where said plurality of press-deformable portions are not provided;
a first sheet member having contacts contacted and deformed by the corresponding pressdeformed portions of said plurality when same are pressed;
a second sheet member having openings each facing a respective one of said contacts of said first sheet member;
a circuit substrate having a plurality of electrode pairs each short-circuited by a respective one of said contacts of said first sheet member at a position facing the corresponding one of said openings in said second sheet member; and
a second metal plate parallel to said frame member in facing relationship to same, said second plate and said frame member holding said first and second sheet members and said circuit substrate therebetween.

10. A thin electronic apparatus according to claim 9, wherein said press-deformable portions of said frame member each have a plurality of arms extending inward in the corresponding opening and an inner key provided at the leading ends of said plurality of arms.

11. A thin electronic apparatus according to claim 9, wherein said circuit substrate includes at least one of a semiconductor element, a power supply and an indicator mounted thereon.

12. A thin electronic apparatus according to claim 11, wherein said semiconductor element is held between said frame member and said circuit substrate.

13. A thin electronic apparatus according to claim 11, wherein at least one of said power supply and said indicator is held between said frame member and said second metal plate.

14. A thin electronic apparatus according to claim 12, wherein at least one of said power supply and said indicator is held between said frame member and said second metal plate.

* * * * *

UNITED STATES PATENT AND TRADEMARK OFFICE
CERTIFICATE OF CORRECTION

PATENT NO. : 4,675,787

DATED : June 23, 1987

INVENTOR(S) : KANAME SUWA

It is certified that error appears in the above-identified patent and that said Letters Patent is hereby corrected as shown below:

COLUMN 1

Line 24, "be" should read --to be--.
    Line 27, "of" should be deleted.
    Line 42, "in a" should read --in such a--.

COLUMN 2

Line 36, "stucture" should read --structure--.
    Line 60, "FIG: 2" should read --FIG. 2--.

COLUMN 3

Line 20, "curethane" should read --urethane--.

COLUMN 7

Line 14, "press" should read --press---.
    Line 45, "include" should read --includes--.

UNITED STATES PATENT AND TRADEMARK OFFICE
CERTIFICATE OF CORRECTION

PATENT NO. : 4,675,787

DATED : June 23, 1987

INVENTOR(S) : KANAME SUWA

It is certified that error appears in the above-identified patent and that said Letters Patent is hereby corrected as shown below:

COLUMN 8

Line 10, "pressdeformed" should read --press-deformable--.

Signed and Sealed this

Twenty-ninth Day of March, 1988

Attest:

DONALD J. QUIGG

*Attesting Officer*  *Commissioner of Patents and Trademarks*